United States Patent [19]

Fukatani

[11] Patent Number: 4,537,299

[45] Date of Patent: Aug. 27, 1985

[54] FACING ASSEMBLY OF A FRICTION CLUTCH DISC

[75] Inventor: Yasunobu Fukatani, Hirakata, Japan

[73] Assignee: Kabushiki Kaisha Daikin Seisakusho, Osaka, Japan

[21] Appl. No.: 393,402

[22] Filed: Jun. 29, 1982

[30] Foreign Application Priority Data

Jun. 30, 1981 [JP] Japan .............................. 56-98240[U]

[51] Int. Cl.³ ............................................. F16D 69/04
[52] U.S. Cl. ............................... 192/107 C; 192/70.14; 192/107 R
[58] Field of Search ............ 192/107 R, 107 C, 70.12, 192/70.14, 113 A

[56] References Cited

U.S. PATENT DOCUMENTS

| | | | |
|---|---|---|---|
| 1,414,490 | 5/1922 | Tresslar | 192/107 R |
| 1,846,560 | 2/1932 | Kattwinkel | 192/107 R |
| 2,054,210 | 9/1936 | Weisenburg | 192/107 R |
| 2,059,576 | 11/1936 | Glick | 192/107 R |
| 2,175,418 | 10/1939 | Wales | 192/107 C |
| 2,178,527 | 10/1939 | Wellman | 192/107 R |
| 2,180,086 | 11/1939 | Kraft | 192/107 R |
| 2,237,624 | 4/1941 | Oldham | 192/107 R |
| 2,277,603 | 3/1942 | Nutt et al. | 192/107 C |
| 3,048,250 | 8/1962 | Kershner | 192/107 R |
| 3,161,260 | 12/1964 | Benini | 192/113 A X |
| 3,184,023 | 5/1965 | Hovde | 192/113 A X |
| 3,241,644 | 3/1966 | Ridenour | 192/107 C |
| 3,397,761 | 8/1968 | Lindquist | 192/70.14 X |
| 3,520,389 | 7/1970 | Smales | 192/107 C |
| 4,286,694 | 9/1981 | Wiseman et al. | 192/70.14 X |

FOREIGN PATENT DOCUMENTS 241741 10/1925 United Kingdom ............ 192/107 R

Primary Examiner—Rodney H. Bonck
Attorney, Agent, or Firm—Armstrong, Nikaido, Marmelstein & Kubovcik

[57] ABSTRACT

The present invention discloses a facing assembly of a friction clutch disc comprising facing fixing plate having plural apertures and arranged at radially outer portion of the clutch disc; and a pair of facings disposed on both faces of the fixing plate, said facings having connecting portions entered into the apertures and integrally connecting both facings together so that the facings may be fixed to the plate. A total sectional area of the connecting portions in radially outer portions of the facings is preferably larger than a total sectional area of the connecting portions in radially inner portions of the facings.

2 Claims, 7 Drawing Figures

FIG.7 FIG.6
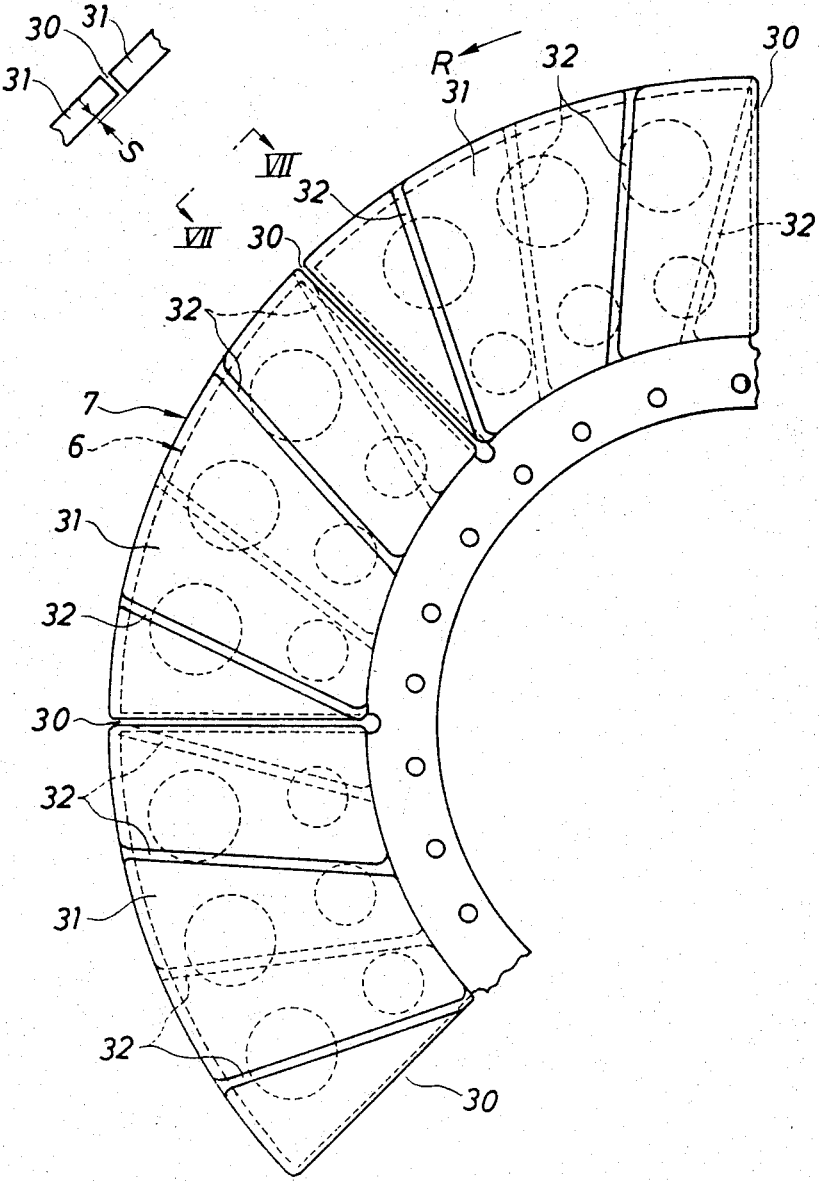

FACING ASSEMBLY OF A FRICTION CLUTCH DISC

BACKGROUND OF THE INVENTION

The present invention relates to a facing assembly of a friction clutch disc in which a facing is fixed to a driven plate or cushioning plates.

As shown in FIG. 1 which is a schematic sectional partial view, a known friction clutch 1 comprises a pair of friction facings 3 which are fixed to both faces of an annular driven plate 2 by rivets 4. Therefore, spot facings for the many rivets 4 should be performed in the facings 3, which requires much labor in a manufacturing process. Also, riveting of the rivets 4 requires much labor. Further, the known construction has such a disadvantage that durability of the facings 3 is low. Because, when the thickness of the facings 3 is reduced to a value of t which is approximately two-thirds of an initial value T, both ends of each rivets 4 are exposed on the surfaces of the facings 3, whereby the facings 3 which still have the enough thickness of t ($\frac{2}{3}$T) are required to be exchanged.

Accordingly, it is an object of the invention to provide an improved facing assembly, overcoming the abovenoted disadvantages.

The essence of the invention is to provide a pair of friction facings which are integrally connected together through portions in apertures formed in a facing fixing plate.

Other and further objects, features and advantages of the invention will appear more fully from the following description of the preferred embodiments of the invention.

BRIEF DESCRIPTION OF THE DRAWINGS

FIG. 6 is a partial elevation of a facing assembly of still another embodiment; and FIG. 7 is a partial side view viewed in a direction shown by arrows VII—VII in FIG. 6.

DETAILED DESCRIPTION OF THE PREFERRED EMBODIMENTS

Figure 1:
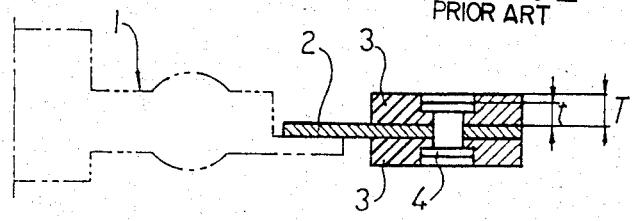
FIG. 1 is a schematic sectional partial view of a known friction clutch disc.
Figure 2:
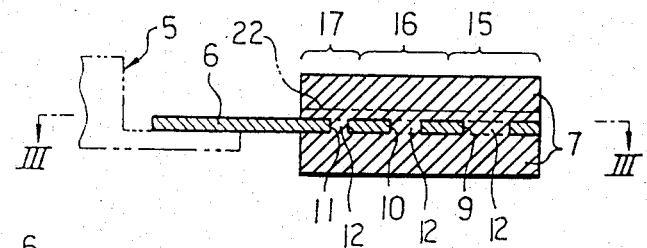
FIG. 2 is a schematic sectional partial view of a friction clutch according to the invention.

Referring to FIG. 2, a clutch disc 5 is provided at its radially outer portion with an annular driven plate 6. A pair of annular facings 7 are disposed on both surfaces of the driven plate 6. A pair of the facings 7 are integrally connected together through facing portions 12 which are entered into apertures 9, 10 and 11 formed in the driven plate 6. An integrally connecting process for forming the integral portions 12 will be detailed later.

Figure 3:
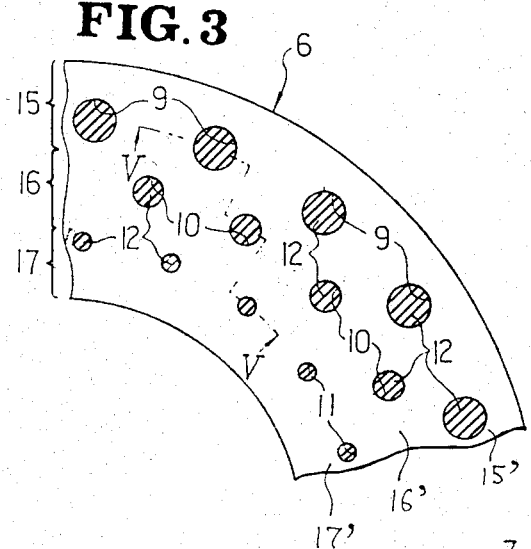
FIG. 3 is a sectional partial view taken along line III—III of FIG. 2.

The apertures 9, 10 and 11 are preferably arranged as detailed hereinafter. When the facings 7 are pressed to a flywheel (not shown) by a pressure plate in a clutch engaging operation, a torque is transmitted from the flywheel to the driven plate 6 through the facings 7. In this operation, a large load corresponding to the torque is applied to radially outer portions 15 of the facings 7, and a rather small load is applied to radially inner portions 17 of the facings 7. In connection with this load distribution, as shown in FIG. 3, respective portions 15', 16' and 17' of the driven plate 6 corresponding to the portions 15, 16 and 17 are provided with the large apertures 9, the middle apertures 10 and rather small apertures 11, respectively, which are circumferentially spaced to each other with angularly equal spaces therebetween, whereby the connecting portions 12 in the outer portions 15 strongly connect the facings 7 together, and the connecting strength by the portions 12 in the inner portions 17 is rather small. As detailed above, a total sectional area of the portions 12 in the outer portions 15 is larger than a total sectional area of the portions 12 in the inner portions 17. Therefore, the distribution state of the load caused by the torque corresponds to the connecting or fixing strength in the respective portions 15, 16 and 17 of the facings 7, so that the facings 7 are prevented from breakage and separation from the driven plate 6.

Instead of the arrangement described above, other arrangements may be employed.

The apertures 9, 10 and 11 may have a same diameter. In this arrangement, many apertures 9 are disposed in the outer portion 15', and a rather small number of the apertures 11 are disposed in the inner portion 17'.

Further, a number and diameters of the apertures 9, 10 and 11 may be varied so that the fixing strength of the facings 7 may substantially correspond to said load distribution.

The apertures 9, 10 and 11 may not be arranged in a triple line at the outer, middle and inner portions 15', 16' and 17', and may be arranged in a double or more than triple line.

In such case that the facings 7 are fixed to the driven plate 6 by means of an adhesive as detailed later, the apertures may be arranged in one line.

Figure 4:
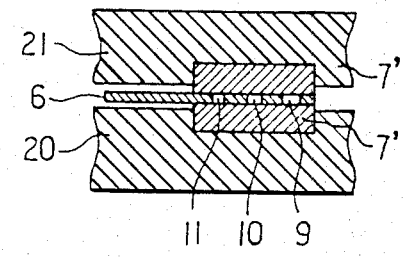
FIG. 4 is a schematic sectional partial view of a forming apparatus.

A forming process of the facings 7 is as follows. Referring to FIG. 4, a forming apparatus comprises a lower die 20 and an upper die 21, both of which are annular or circular. A facing material 7' is placed on the lower die 20, and other facing material 7' is placed on the lower facing material 7' with the driven plate 6 therebetween. Both facing materials 7' are organic material which are made of asbestos fibers and binder such as rubber, phenolic plastic or the like added to the fiber. The materials 7' are pre-shaped in substantially annular form before being set on the die 20, and are highly flexibile before the forming process by dies 20 and 21. The forming process is performed by heating and compressing the materials 7' to result in predetermined finished shape. In this process, parts of the compressed materials 7' enter and fill the apertures 9, 10 and 11 to form the parts 12 in FIG. 2 which integrally connect the facings 7. In this molding process, the materials 7' are expected to be adhered to the surfaces of the driven plate 6 by their own adhesion. Known adhesive may be applied to both surfaces of the driven plate 6 before the forming, so that the fixing strength of the facings 7 may be increased further.

According to the invention, as detailed before, a pair of the facings 7 disposed on both surfaces of the driven plate 6 are integrally and continuously connected to each other through the portions 12 in the apertures 9, 10 and 11, whereby the facings 7 are fixed to the plate 6 (a facing fixing plate). Therefore, the conventional rivets are unnecessary to fix the facings 7, and a riveting process and a spot facing process for the rivets can be eliminated in the manufacturing process. Thus, the manufacturing process can be simplified and the manufacturing cost can be reduced.

In the embodiment illustrated in FIG. 2, the apertures 9, 10 and 11 are formed by punching, and the facings 7 fill up the voids formed by punching to secure the facings 7 to the plate 6. Therefore, even in such case that the facings 7 are largely worn and thickness between worn friction faces 22 and the plate 6 is reduced to a large extent, any member such as a rivet is not exposed on the faces 22, and the facings 7 can be used even after the above wear. Thus, durability of the facings 7 increases.

Figure 5:
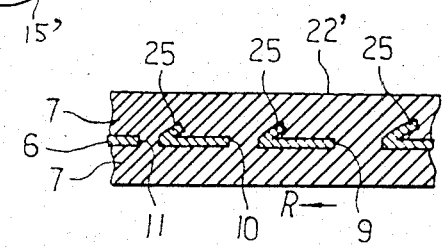
FIG. 5 is a schematic sectional partial view of a facing assembly of other embodiment.

The present invention may be modified as illustrated in FIGS. 5, 6 and 7.

Referring to FIG. 5, the apertures 9, 10 and 11 are formed by partially cutting and erecting portions 25 of the driven plate 6. The portions 25 are entered into the facings 7 and functions as anchors, so that the fixing strength of the facings 7 increases further. Each portion 25 may be inclined, as illustrated in FIG. 5, with respect to the surfaces of the driven plate 6, so that the portion 25 may protrude from the base end thereof to the top end oppositely to a clutch rotating direction R, in other words, so that the top end of each portion 25 may occupy the rear end position with respect to the clutch rotating direction R. The inclined portions 25 can bite into the facings 7 when the torque is transmitted to the facings 7, which further increases the facing fixing strength. In such case that the sufficient strength is achieved, the portions 25 are preferably erected short so that the portions 25 may not be exposed on the faces of the largely worn facings 7. The portions 25 may protrude in two or more directions from each edge of the apertures.

Referring to FIG. 6, radially middle and outer portion of the driven plate 6 is provided with several radial slits 30, which divide the facings 7 into several arc facing portions 31. Each portion 31 is provided at its friction face with circumferentially spaced two grooves 32. Each groove 32 is inclined with respect to the radial direction in the facings 7, and the radially inner end of the groove 32 occupies the forward position with respect to the clutch rotating direction R. The groove 32 faced to the flywheel are illustrated in solid lines. The groove 32 faced to the pressure plate are illustrated in dotted lines. Both kinds of the groove 32 are disposed alternately with respect to the clutch rotating direction R.

Referring to FIG. 7, the adjacent two facing portions 31 and 31 with the slit 30 therebetween are shifted in the axial direction of the clutch, in other words, in the direction perpendicular to the friction faces of the facings 7, and a slight axial distance s is spaced between the two adjacent portions 31 and 31. Therefore, when the facings 7 are pressed to the flywheel by the pressure plate, the driven plate 6 is elastically deformed to reduced the distance s to zero. Whereby, when the pressure by the pressure plate is released in a next clutch releasing operation, the driven plate 6 elastically returns to the initial shape having the shifted distance s. Thus, the facings 7 reliably leave the flywheel, so that any harmful slip does not occur between the flywheel and the facing 7. A leading edge of the facings with respect to the direction of rotation is found at slit 30. The greater distance between the leading edge and the first groove on each of the friction facings is located on the side nearest an engaging pressure plate compared with the opposing side nearest an engaging flywheel. The area formed between the leading edge and the first groove on the pressure plate side covers at least a radially inner and a radially outer aperture.

The invention may be employed in such a clutch disc that comprises annularly arranged plural cushioning plates instead of the illustrated driven plate 6. The facings 7 may be made of sintered metal.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed:

1. A facing assembly of a friction clutch disc, comprising:
    a facing fixing plate having plural apertures arranged at radially outer portions and radial inner portions;
    a pair of facings disposed on both faces of the fixing plate, said facings integrally connecting each other by connection portions extending through said plural apertures such that said facings are fixed to said fixing plate, and wherein a total sectional area of connecting portions in radially outer portions of the facings is larger than a total sectional area of connecting portions in radially inner portions of the facings, and wherein the facings and the plate portion to which the facings are fixed are divided into plural portions by substantially radial slits, and the adjacent two facings portions with each slit therebetween are axially shifted with respect to each other with a slight axial distance therebetween so that the plate portions pressed to a flywheel by a pressure plate may be elastically deformed to reduce the axial distance to zero; and
    grooves formed in each facing portion running from the radial inner portion to the radial outer portion of each facing portion, said grooves being inclined with respect to the radial direction and the radially inner and end of each of said grooves occupying a forward position with respect to the clutch rotating direction wherein said grooves on opposing sides of said fixing plate alternate with respect to the clutch rotating direction, and wherein the greater distance from a leading edge of the facings, with respect to the clutch rotating direction, to the first groove of each facing portion from said leading edge is located on the side nearest an engaging pressure plate compared with the opposing side nearest an engaging flywheel.

2. The facing assembly of claim 1, wherein the area between said leading edge and the first groove of one of said facing portions, which is on the side nearest the pressure plate covers at least a radially inner and a radially outer aperture.

* * * * *